United States Patent
Köllner et al.

(10) Patent No.: US 8,412,403 B2
(45) Date of Patent: Apr. 2, 2013

(54) METHOD AND DEVICE FOR INCREASING THE PRECISION OF THE POSITION DETERMINATION OF A MOTOR-DRIVEN CLOSURE ELEMENT OF A VEHICLE

(75) Inventors: Wolfgang Köllner, Vienna (AT); Roman Morawek, Vienna (AT); Peter Stephan Mulacz, Pottenbrunn (AT)

(73) Assignee: Continental Automotive GmbH, Hannover (DE)

( * ) Notice: Subject to any disclaimer, the term of this patent is extended or adjusted under 35 U.S.C. 154(b) by 390 days.

(21) Appl. No.: 12/738,363

(22) PCT Filed: Sep. 1, 2008

(86) PCT No.: PCT/EP2008/061483
§ 371 (c)(1),
(2), (4) Date: Apr. 16, 2010

(87) PCT Pub. No.: WO2009/053138
PCT Pub. Date: Apr. 30, 2009

(65) Prior Publication Data
US 2010/0211273 A1    Aug. 19, 2010

(30) Foreign Application Priority Data
Oct. 19, 2007  (DE) .......................... 10 2007 050 173

(51) Int. Cl.
*G06F 7/00*    (2006.01)
(52) U.S. Cl. ..................... 701/30.8; 701/30.2; 701/30.5; 701/29.7
(58) Field of Classification Search ............... 701/49, 701/36, 30.8, 30.5, 30.2, 29.7, 32.9
See application file for complete search history.

(56) References Cited

U.S. PATENT DOCUMENTS

| | | | |
|---|---|---|---|
| 6,144,179 A | 11/2000 | Kessler et al. | 316/565 |
| 6,472,836 B1 | 10/2002 | Uebelein et al. | 316/445 |
| 6,552,506 B2 * | 4/2003 | Kramer et al. | 318/466 |
| 7,741,800 B2 | 6/2010 | Buhlheller et al. | 318/432 |
| 7,800,332 B2 * | 9/2010 | Whinnery | 318/466 |
| 8,089,230 B2 * | 1/2012 | Fuchs et al. | 318/286 |
| 2002/0057084 A1 | 5/2002 | Premann | 324/207.2 |
| 2004/0249513 A1 * | 12/2004 | Anderson et al. | 700/275 |
| 2005/0251314 A1 * | 11/2005 | Schindler et al. | 701/49 |
| 2007/0113682 A1 | 5/2007 | Ehrlich et al. | 73/862.328 |
| 2008/0272726 A1 * | 11/2008 | Buhlheller et al. | 318/466 |
| 2009/0132114 A1 * | 5/2009 | Torsten | 701/36 |

FOREIGN PATENT DOCUMENTS

| | | |
|---|---|---|
| DE | 19633941 A1 | 2/1998 |
| DE | 19729238 C1 | 8/1998 |
| DE | 202004010211 U1 | 8/2005 |
| DE | 102005047386 A1 | 4/2007 |
| EP | 1175598 B1 | 4/2000 |
| WO | 00/17982 | 3/2000 |
| WO | WO 2006002899 A1 * | 1/2006 |

OTHER PUBLICATIONS

International PCT Search Report, PCT/EP2008/061483, 4 pages, Mailed Dec. 17, 2008.

* cited by examiner

*Primary Examiner* — Kaitlin Joerger
*Assistant Examiner* — Ernesto Suarez
(74) *Attorney, Agent, or Firm* — King & Spalding L.L.P.

(57) ABSTRACT

In a method and a device for increasing the precision of the position determination of a motor-driven closure element of a vehicle, the data corresponding to a force-displacement reference curve and the data corresponding to a force-displacement actual value curve are used, a correlation function is calculated, the maximum thereof is found, and the counter status of a position counter is corrected by using the position offset associated with the determined maximum.

18 Claims, 3 Drawing Sheets

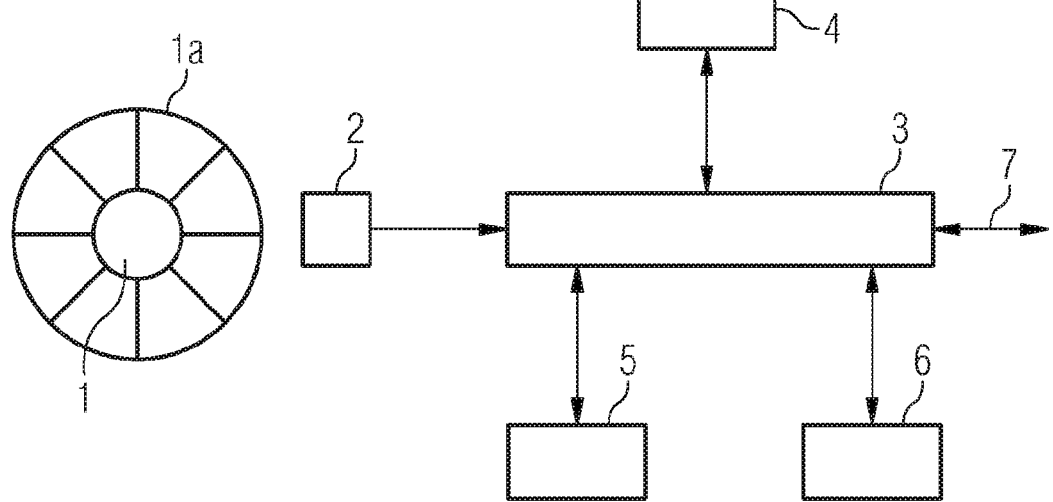
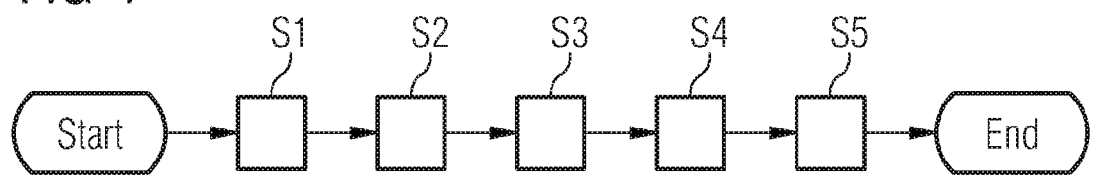
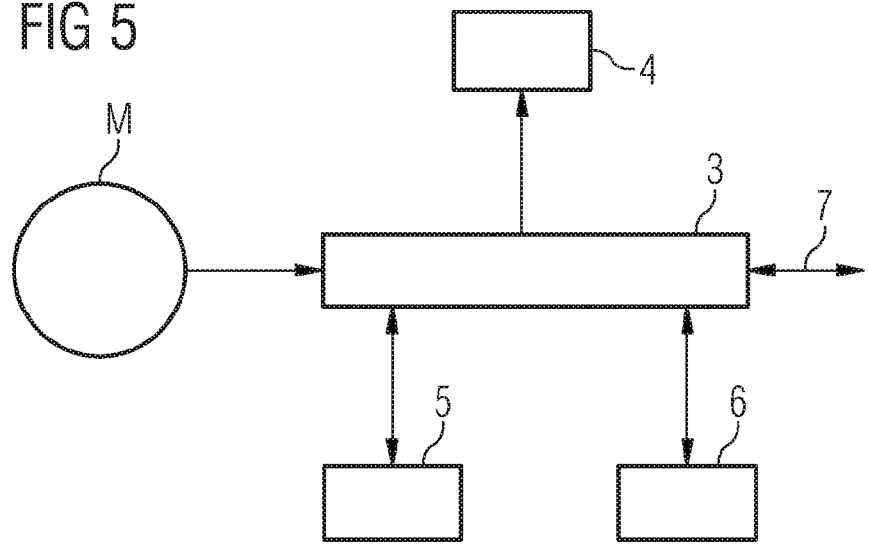

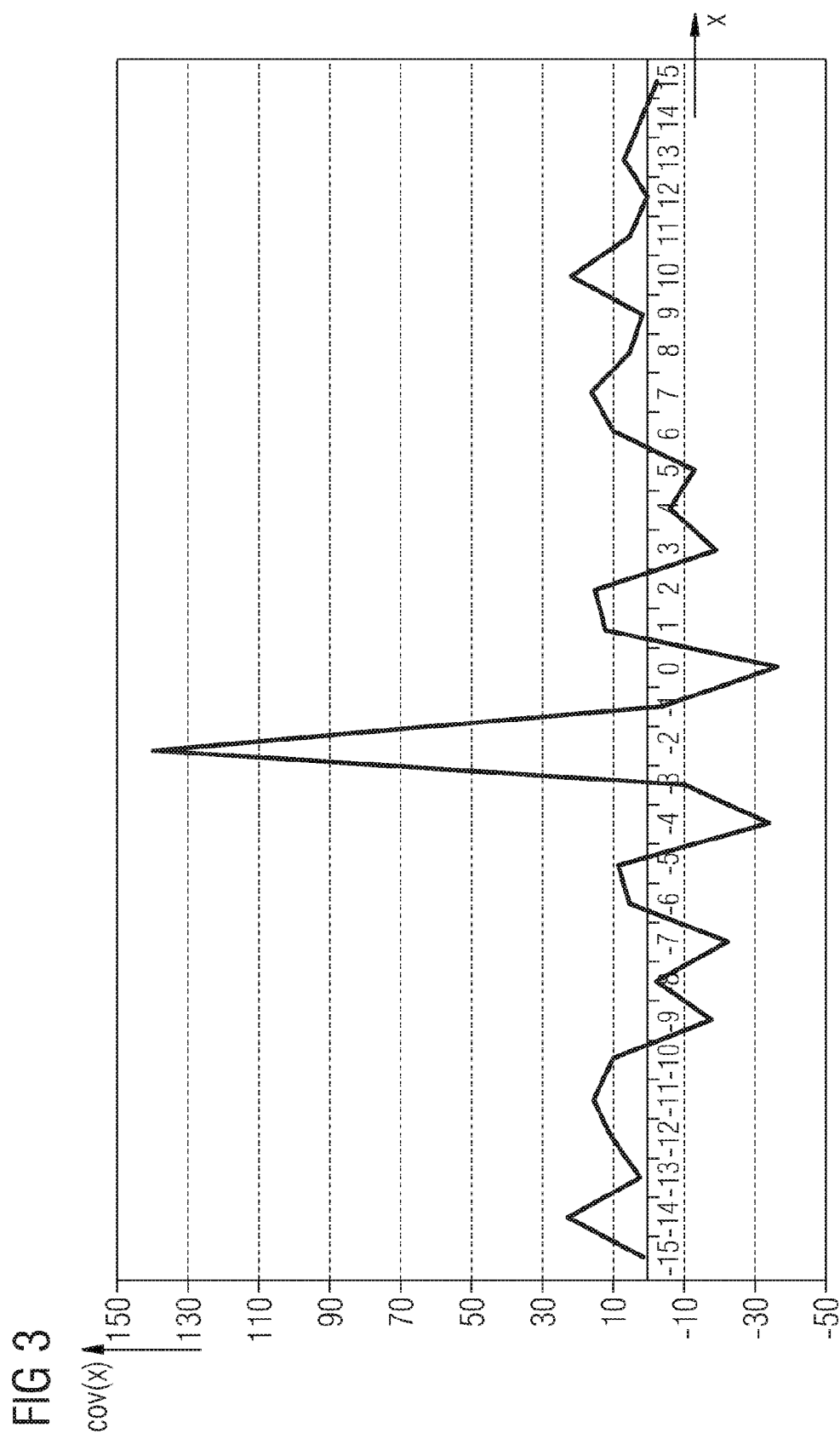

METHOD AND DEVICE FOR INCREASING THE PRECISION OF THE POSITION DETERMINATION OF A MOTOR-DRIVEN CLOSURE ELEMENT OF A VEHICLE

CROSS-REFERENCE TO RELATED APPLICATIONS

This application is a U.S. National Stage Application of International Application No. PCT/EP2008/061483 filed Sep. 1, 2008, which designates the United States of America, and claims priority to German Application No. 10 2007 050 173.2 filed Oct. 19, 2007, the contents of which are hereby incorporated by reference in their entirety.

TECHNICAL FIELD

The invention relates to a method and a device for increasing the precision of the position determination of a motor-driven closure element of a vehicle.

BACKGROUND

Motor-driven closure elements of vehicles are for example window-lifters and sliding roofs. The respective associated motor device is equipped with a position determination facility. This is necessary so that the respective window or sliding roof can be stopped at an intended position. Moreover, such position determination is also necessary to ensure compliance with legal requirements in respect of anti-trap protection.

In known means for position determination for window-lifters, a first-time initialization is implemented during production by running the window up to its upper mechanical stop. This is detected by a control unit and used as reference for later position counting processes. These position counting processes take place during the up and down movement of the window by counting the Hall sensor pulses related to the rotation of the respective drive motor. These pulses are generated on the basis of the rotation of the motor shaft to which a magnet wheel is attached, the latter being provided with alternate sectors and poles of differing polarity in the circumferential direction.

Generally for position determination, two Hall sensors offset by 90° from each other are used. It is therefore possible to determine both the rotational velocity and the direction of rotation.

In order to reduce the costs of the drive, the use of only one single Hall sensor for position determination is already known. In this case this is provided merely for counting the pulses. The information regarding the direction of rotation is derived from the known states of the motor control relays. Inaccuracies in the position determination cannot be ruled out in this system.

If two Hall sensors are used for position determination to avoid the problem of position inaccuracy, then this results in higher system costs, in particular in the motor and in the cable harness.

Apart from systems with Hall sensors, realizing position determination by counting the motor commutator current ripple, as described in DE 197 29 238 C1 for example, is also already known. Position inaccuracy is also inherent in such systems.

Avoiding the problem of position inaccuracy by regularly re-initializing the position determination by always running the window up to the upper mechanical stop or every $n^{th}$ window movement is also already known. However, this has the disadvantage of higher loading of the mechanical system, which in turn results in higher mechanical system costs. Furthermore, this is not always possible. For example, if the window glass is frequently operated and frequently jams without the window fully closing or opening, then re-initialization is not possible.

A method and a device for determining the actual reversal of the direction of rotation of a rotary servo actuator, is known from EP 1 175 598 B1. In this method, an asymmetric rotary encoder disk on the rotor is used to provide speed-proportional pulse trains with interposed reference pulses. These pulses are detected by a single sensor on the stator and evaluated in an evaluator.

Another device for determining the actual reversal of direction of rotation of a reversible rotary actuator is known from DE 10 2005 047 366 A1. This device also uses a rotary encoder disk with an asymmetric coding structure distributed around the periphery of the rotary encoder disk, as well as a single detector which, by sampling the coding structure when the rotary encoder disk rotates, generates a rotor speed-dependent pulse signal. This signal is fed to an evaluator which, by evaluating the pulse edges, determines the actual reversal of the direction of rotation. Said coding structure of the rotary encoder disk is formed by coding sectors having a first sector width and a pair of reference coding sectors having a second sector width.

An actuator for moving power-operated closure elements, in particular windows, partitions or roof elements in motor vehicles, is known from DE 196 33 941 C2. Here the movement of the closure element is realized via a displacement path and with a definable closing force limit when the closure element comes up against an obstacle. At the same time, there is the control dependency of the respective motive force of the closure element corresponding to a previously recorded operational friction force/displacement path diagram and having a friction force that is increased in each case by the permissible closing force.

SUMMARY

According to various embodiment, a way can be demonstrated by which the position determination of a motor-driven closure element of a vehicle can be improved.

According to an embodiment, a method for increasing the precision of the position determination of a motor-driven closure element of a vehicle, may comprise the following steps: determination and storage of data which corresponds to a force-displacement reference curve; determination and storage of data which corresponds to a force-displacement actual-value curve; calculation of a correlation function using the data which corresponds to the force-displacement reference curve, and the data which corresponds to the force-displacement actual-value curve; determination of the maximum of the correlation function; and correction of the counter status of a position counter in order to correct a counting error, using the position offset value associated with the determined maximum.

According to a further embodiment, the determination and storage of the data which corresponds to the force-displacement reference curve may be carried out during the production of the vehicle in the factory. According to a further embodiment, the data which corresponds to the force-displacement reference curve can be stored in a non-volatile memory. According to a further embodiment, the determination and storage of the data which corresponds to the force-displacement actual-value curve may be carried out after each movement of the closure element during the operation of the vehicle. According to a further embodiment, the data which corresponds to the force-displacement actual-value curve may be stored in a volatile memory. According to a further embodiment, the stored data may be differential data. According to a further embodiment, the calculation of the correlation function may be realized according to the following relationship:

$$\mathrm{cov}(x) = \sum_i \Delta F_{ref}(i) \cdot \Delta F_{act}(i-x),$$

where $\Delta F_{ref}(i)$ corresponds to the $i^{th}$ differential value of the reference curve and $\Delta F_{act}(i-x)$ corresponds to the $i^{th}$ differential value of the actual-value curve displaced by x positions. According to a further embodiment, the correction of the counter status of the position counter may be implemented only when the determined maximum of the correlation function exceeds the second highest value of the correlation function by a predetermined factor. According to a further embodiment, the calculation of the correlation function and the subsequent steps can be implemented in the immobile state of the system.

According to another embodiment, a device for increasing the precision of the position determination of a motor-driven closure element of a vehicle, may comprise a motor movement detection device, a position counter, an evaluator, a first memory for storing data which corresponds to a force-displacement reference curve, and a second memory for storing data which corresponds to a force-displacement actual-value curve, wherein the evaluator is operable to calculate a correlation function, using the data which corresponds to the force-displacement reference curve, and the data which corresponds to the force-displacement actual-value curve, wherein the evaluator is operable to determine the maximum of the correlation function, and wherein the evaluator is operable to correct the counter status of the position counter, using the position offset value associated with the determined maximum.

According to a further embodiment of the device, the first memory can be a non-volatile memory. According to a further embodiment of the device, the first memory can be an EEPROM. According to a further embodiment of the device, the evaluator may be operable to implement determination and storage of the data which corresponds to the actual-value curve after every movement of the closure element during the operation of the vehicle. According to a further embodiment of the device, the second memory can be a volatile memory. According to a further embodiment of the device, the second memory can be a RAM associated with the evaluator. According to a further embodiment of the device, the evaluator can be intended to carry out the calculation of the correlation function according to the following relationship:

$$\mathrm{cov}(x) = \sum_i \Delta F_{ref}(i) \cdot \Delta F_{act}(i-x).$$

where $\Delta F_{ref}(i)$ corresponds to the $i^{th}$ differential value of the reference curve and $\Delta F_{act}(i-x)$ corresponds to the $i^{th}$ differential value of the actual-value curve displaced by x positions. According to a further embodiment of the device, the evaluator may be intended to check whether the maximum of the correlation function exceeds the second highest value of the correlation function by a predetermined factor, and the correction of the counter status of the position counter is implemented only when the determined maximum of the correlation function exceeds the second highest value of the correlation function by at least the predetermined factor.

BRIEF DESCRIPTION OF THE DRAWINGS

Further advantageous characteristics of the various embodiments are revealed in its exemplary explanation with the aid of the figures, wherein:

FIG. 1 shows a block diagram of a first device for increasing the precision of the position determination of a motor-driven closure element of a vehicle;

FIG. 3 shows an example of a diagram in which the covariance is plotted against the position offset;

FIG. 4 shows a flowchart for explaining a method for increasing the precision of the position determination of a motor-driven closure element of a vehicle; and FIG. 5 shows a block diagram of a second device for increasing the precision of the position determination of a motor-driven closure element of a vehicle.

DETAILED DESCRIPTION

Figure 2:
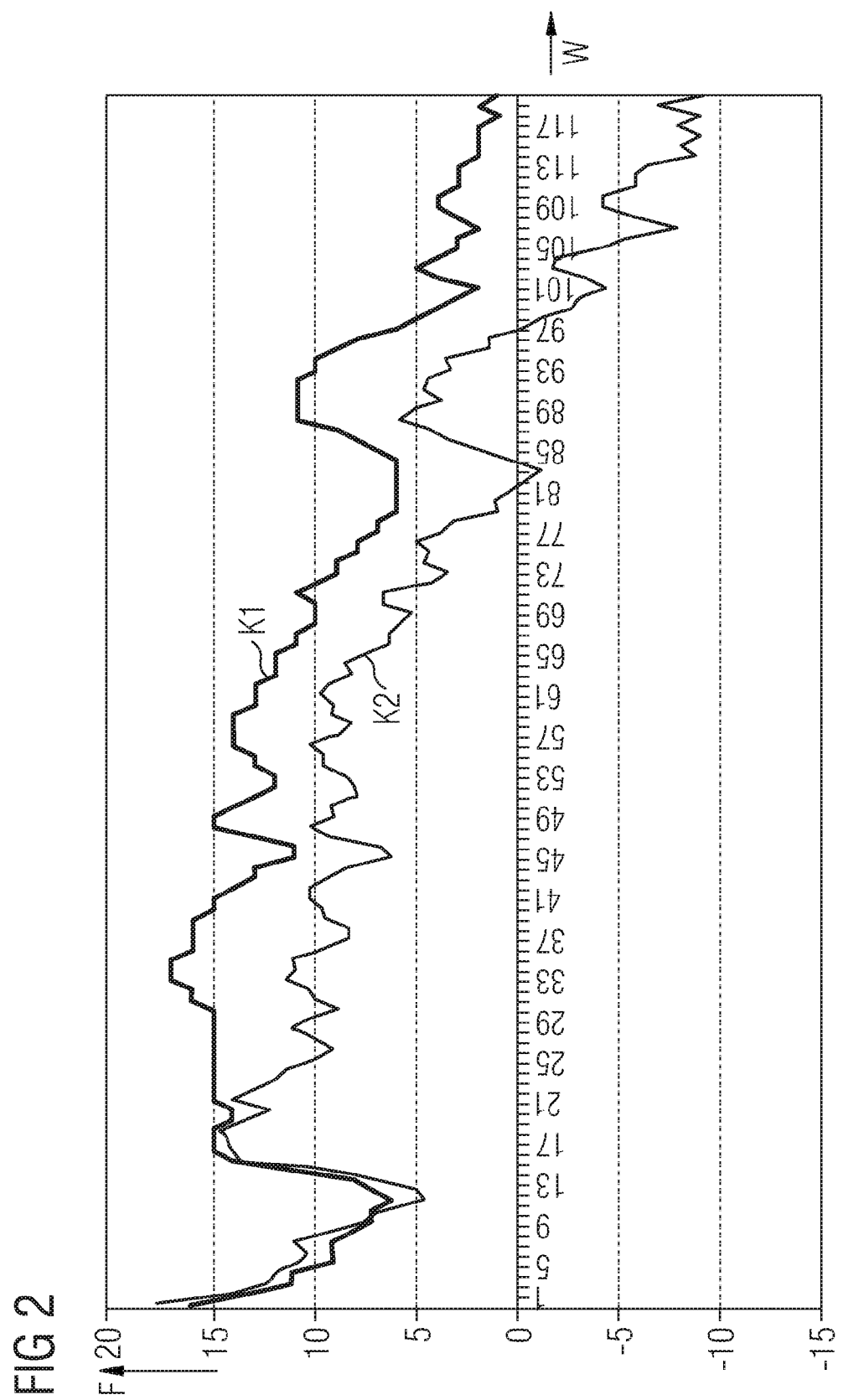
FIG. 2 shows an example of the force-displacement diagram of a window-lifter system.

The advantages of the various embodiments are, in particular, that for the correction of the position determination, it is not necessary to move the respective closure element up to an end stop. If the position determination is realized by means of Hall sensor techniques then one single Hall sensor is adequate to carry out a precise position determination. This enables the system costs to be kept low. If the position determination is realized by counting the commutator current ripple, then counting problems which arise when movement is started, when movement is stopped and when the direction of movement is reversed, are eliminated by the various embodiments.

FIG. 1 shows a block diagram which, for an understanding of various embodiments, includes the main components of a device for increasing the precision of the position determination of a motor-driven closure element of a vehicle. This motor-driven closure element involves a window-lifter of a vehicle. The raising and lowering of the window glass is achieved by means of an electric motor drive which has a stator and a rotor. The rotor contains a rotor shaft 1, to which a rotary encoder disk 1a is fixed for co-rotation. The encoder disk 1a has coding sectors or poles. When the rotor shaft rotates with the rotary encoder disk attached to it, pulse signals are detected by a sensor system 2 and are fed to an evaluator 3 which is in the form of a microcomputer. On receipt of each pulse, the evaluator 3 increments the position counter value stored in a position counter 4, so that the counter status of the position counter 4 precisely describes the instantaneous position of the window glass.

The evaluator 3 is linked via a bus 7 to one or more further control units of the vehicle.

Furthermore, the illustrated device has a first memory 5 and a second memory 6. The first memory 5 is a non-volatile memory, for example an EEPROM. Data which represents a force-displacement reference curve is stored in this memory 5. This data is already determined during production of the vehicle in the factory and is stored in a non-volatile manner in the first memory 5. This data is individually assigned to the respective window-lifter drive and contains data concerning which force from the motor has to be applied to which window position in order to close the respective window glass.

In the case of the second memory 6, this can be a volatile memory, for example a RAM or the main memory of the evaluator 3 which is realized as a computer. A force-displacement actual-value curve determined during the operation of the vehicle each time the window glass is opened and closed, is stored in the second memory 6.

The data stored in the memories 5 and 6 is stored in the form of differential values, that is to say the difference between two adjacent force values is always stored in the respective memory.

The evaluator 3 uses the force-displacement reference curve stored in the first memory 5, and the force-displacement actual-value curve stored in the second memory 6, in order to check during operation whether counting errors have occurred with regard to the counting of pulses output by the sensor system 2, which have resulted in a faulty counter status of the position counter 4. If such a counting error is detected, it is adjusted by the evaluator 3. During said check, the evaluator 3 calculates a correlation function using the data corresponding to the force-displacement reference curve, and the data corresponding to the force-displacement actual-value curve. This is obtained according to the following relationship:

$$\text{cov}(x) = \sum_i \Delta F_{ref}(i) \cdot \Delta F_{act}(i-x).$$

Here the expression cov corresponds to the covariance, $\Delta F_{ref}(i)$ to the $i^{th}$ differential value of the reference curve and $\Delta F_{act}(i-x)$ to the $i^{th}$ differential value of the actual-value curve displaced by x positions. Consequently, the cross-correlation of the reference curve with the current closing curve displaced by x positions is determined. If the function cov(x) is now examined, it shows that this is a maximum at those positions x which correspond to the existing counting errors.

This is illustrated below with the aid of FIGS. 2 and 3, it being possible in FIG. 2 for the reference curve stored in the first memory 5 to be denoted by K1 and the actual-value curve stored in the second memory 6 to be denoted by K2.

The differences between the two curves K1 and K2 are based on two reasons. On the one hand variations occur in the force-displacement relationships during the operating period of the vehicle as a result of environmental influences, wear and ageing effects and maintenance influences. These differences are non-systematic differences. They have no significant influence during the determination of the correlation function.

Moreover, systematic differences, namely a displacement by a few positions, which can be attributed to a miscount of the position count, occur between the two curves K1 and K2. These systematic differences are used in various embodiments to detect and correct any existing counting errors.

FIG. 3 shows an example of a diagram in which the covariance cov(x) is plotted against the position offset x. The maximum of the function cov(x) is located at the value x=−2. This maximum is more pronounced the greater the ripple of the force-displacement curves illustrated in FIG. 2. The value x=−2 corresponds to the existing counting error. To correct this counting error, the counter value of the position counter 4 must be modified by this value, and is instigated by the evaluator 3.

The position offset or counting error can therefore be determined by calculating the above-mentioned correlation function cov(x) and subsequently searching for the maximum of this correlation function. At the same time, the evaluation must be carried out only in a comparatively narrow range around x=0, since generally in practice only a small position error occurs. Preferably, a correction to the counter status of the position counter 4 is only carried out when the maximum of the correlation curve is pronounced, for example it has a value that is at least double that of the second largest value of the correlation function. Practical trials have shown that force characteristics differing only slightly from each other in successive closing processes of the respective window glasses have no negative influence on the possibility of determining the maximum of the correlation function.

FIG. 4 shows a flowchart for explaining a method for increasing the precision of the position determination of a motor-driven closure element of a vehicle.

In this method, following the start in step S1, the data of the force-displacement reference curve is determined in the factory during manufacture of the vehicle and stored in a non-volatile manner in the first memory 5.

In the subsequent operation of the vehicle, at each closure of the window glass, determination of the data of a force-displacement actual-value curve and their storage in the second memory 6, takes place at step S2.

The calculation of the correlation function as described above takes place in the following step S3, using the data stored in the memories 5 and 6.

The maximum of this correlation function is sought in step S4 in order to obtain information about any counting error in the position counter 4.

Finally in step S5, a correction is made to the counter status of the position counter 4, using the information about the counting error.

The method is then ended. It is repeated during the operating period of the vehicle, starting at step S2, preferably at each closing process of the respective window glass.

As an alternative to the exemplary embodiment described above, the subject matter of various embodiments can in particular also be used in conjunction with sliding roofs of vehicles. In the case of sliding roofs, due to the given complex mechanical system, the force-displacement curve characteristics are even more uneven, so that detection of a maximum of the correlation function is simplified.

The invention is also independent of the type of determination of the counting pulse. The ripple of the commutator current of the electric motor can be counted as an alternative to the Hall sensor technique described above.

FIG. 5 shows a block diagram of a second device for increasing the precision of the position determination of a motor-driven closure element of a vehicle. In this second device, the determination of the counting pulses is not realized by the use of Hall sensors, but by counting the ripple of the commutator current of the electric motor.

The illustrated device has an electric motor M, an evaluator 3 realized as a microcomputer, a position counter 4, a first memory 5, a second memory 6 and a bus 7, to which the evaluator 3 is connected. In this device the measurement and evaluation of the motor current $i_M$ is carried out in the evaluator 3. This includes the counting of the ripple of the commutator current of the electric motor M. The count value is stored in a position counter 4.

The memories 5 and 6 are similarly constructed and have the same function as the memories 5 and 6 in the device shown in FIG. 1. The method for increasing the precision of the position determination is also realized as was described above in conjunction with FIGS. 1-4.

The calculation of the correlation function and the subsequent steps were preferably implemented in the immobile state of the system. In this immobile state, adequate computing power is available to the evaluator 3, so that the calculations have no negative influence on the computing load of the system.

What is claimed is:

1. A computer-implemented method for increasing the precision of the position determination of a motor-driven closure element of a vehicle, comprising the following steps:
   determination and storage of data which corresponds to a force-displacement reference curve representative of a force applied to the motor-driven closure element;
   determination and storage of data which corresponds to a force-displacement actual-value curve representative of a force applied to the motor-driven closure element during vehicle operation;
   calculation by an evaluator of a correlation function based on the force-displacement curve and the force-displacement actual-value curve using the data which corresponds to the force-displacement reference curve, and the data which corresponds to the force-displacement actual-value curve;
   determination by the evaluator of a maximum value of the correlation function; and
   correction of a counter status of a position counter by the evaluator in order to correct a counting error, using a position offset value associated with the determined maximum;
   wherein the determination and storage of the data which corresponds to the force-displacement reference curve is carried out during the production of the vehicle;
   wherein the determination and storage of the data which corresponds to the force-displacement actual-value curve is carried out after each movement of the closure element during the operation of the vehicle.

2. The method according to claim 1, wherein the data which corresponds to the force-displacement reference curve are stored in a non-volatile memory.

3. The method according to claim 1, wherein the data which corresponds to the force-displacement actual-value curve are stored in a volatile memory.

4. The method according to claim 1, wherein the stored data is differential data.

5. The method according to claim 4, wherein the calculation of the correlation function is realized according to the following relationship:

$$\mathrm{cov}(x) = \sum_i \Delta F_{ref}(i) \cdot \Delta F_{act}(i-x),$$

where $\Delta F_{ref}(i)$ corresponds to the $i^{th}$ differential value of the reference curve and $\Delta F_{act}(i-x)$ corresponds to the $i^{th}$ differential value of the actual-value curve displaced by x positions.

6. The method according to claim 1, wherein
the correction of the counter status of the position counter is implemented only when the determined maximum of the correlation function exceeds a second highest value of the correlation function by a predetermined factor.

7. The method according to claim 1, wherein the calculation of the correlation function and the subsequent steps are implemented in an immobile state.

8. A device for increasing the precision of the position determination of a motor-driven closure element of a vehicle, comprising:
   a motor movement detection device,
   a position counter,
   a first memory for storing data which corresponds to a force-displacement reference curve representative of a force applied to the motor-driven closure element,
   a second memory for storing data which corresponds to a force-displacement actual-value curve representative of a force applied to the motor-driven closure element during vehicle operation,
   an evaluator operable to calculate a correlation function based on the force-displacement curve and the force-displacement actual-value curve, using the data which corresponds to the force-displacement reference curve, and the data which corresponds to the force-displacement actual-value curve, further operable to determine a maximum value of the correlation function, and further operable to correct a counter status of the position counter, using a position offset value associated with the determined maximum;
   wherein the evaluator is operable to implement determination and storage of the data which corresponds to the actual-value curve after every movement of the closure element during the operation of the vehicle.

9. The device according to claim 8, wherein the first memory is a non-volatile memory.

10. The device according to claim 9, wherein the non-volatile memory is an EEPROM.

11. The device according to claim 8, wherein the second memory is a volatile memory.

12. The device according to claim 11, wherein the volatile memory is a RAM associated with the evaluator.

13. The device according to claim 8, wherein the evaluator is operable to carry out the calculation of the correlation function according to the following relationship:

$$\mathrm{cov}(x) = \sum_i \Delta F_{ref}(i) \cdot \Delta F_{act}(i-x),$$

where $\Delta F_{ref}(i)$ corresponds to the $i^{th}$ differential value of the reference curve and $\Delta F_{act}(i-x)$ corresponds to the $i^{th}$ differential value of the actual-value curve displaced by x positions.

14. The device according to claim 8, wherein the evaluator is operable to check whether the maximum of the correlation function exceeds a second highest value of the correlation function by a predetermined factor, and the correction of the counter status of the position counter is implemented only when the determined maximum of the correlation function exceeds the second highest value of the correlation function by at least the predetermined factor.

15. A device for increasing the precision of the position determination of a motor-driven closure element of a vehicle, comprising:
   a motor movement detection device,
   a position counter,
   a first memory for storing data which corresponds to a force-displacement reference curve representative of a force applied to the motor-driven closure element,
   a second memory for storing data which corresponds to a force-displacement actual-value curve representative of a force applied to the motor-driven closure element during vehicle operation,
   a microprocessor programmed
      to calculate a correlation function based on the force-displacement curve and the force-displacement actual-value curve, using the data which corresponds to the force-displacement reference curve, and the data which corresponds to the force-displacement actual-value curve, to determine a maximum value of the correlation function, and to correct a counter status of the position counter, using a position offset value associated with the determined maximum;

wherein the microprocessor is further programmed to implement determination and storage of the data which corresponds to the actual-value curve after every movement of the closure element during the operation of the vehicle.

16. The device according to claim 15, wherein the microprocessor is further programmed to carry out the calculation of the correlation function according to the following relationship:

$$\text{cov}(x) = \sum_i \Delta F_{ref}(i) \cdot \Delta F_{act}(i-x),$$

where $\Delta F_{ref}(i)$ corresponds to the $i^{th}$ differential value of the reference curve and $\Delta F_{act}(i-x)$ corresponds to the $i^{th}$ differential value of the actual-value curve displaced by x positions.

17. A device for increasing the precision of the position determination of a motor-driven closure element of a vehicle, comprising:

a motor movement detection device, a position counter, a first memory for storing data which corresponds to a force-displacement reference curve representative of a force applied to the motor-driven closure element, a second memory for storing data which corresponds to a force-displacement actual-value curve representative of a force applied to the motor-driven closure element during vehicle operation, a processor operable to:

calculate a correlation function based on the force-displacement curve and the force-displacement actual-value curve, using the data which corresponds to the force-displacement reference curve, and the data which corresponds to the force-displacement actual-value curve, determine a maximum value of the correlation function, and correct a counter status of the position counter, using a position offset value associated with the determined maximum;

wherein the processor is operable to carry out the calculation of the correlation function according to the following relationship:

$$\text{cov}(x) = \sum_i \Delta F_{ref}(i) \cdot \Delta F_{act}(i-x),$$

where $\Delta F_{ref}(i)$ corresponds to the $i^{th}$ differential value of the reference curve and $\Delta F_{act}(i-x)$ corresponds to the $i^{th}$ differential value of the actual-value curve displaced by x positions.

18. A device for increasing the precision of the position determination of a motor-driven closure element of a vehicle, comprising:

a motor movement detection device, a position counter, a first memory for storing data which corresponds to a force-displacement reference curve representative of a force applied to the motor-driven closure element, a second memory for storing data which corresponds to a force-displacement actual-value curve representative of a force applied to the motor-driven closure element during vehicle operation, a processor operable to:

calculate a correlation function based on the force-displacement curve and the force-displacement actual-value curve, using the data which corresponds to the force-displacement reference curve, and the data which corresponds to the force-displacement actual-value curve, determine a maximum value of the correlation function, and correct a counter status of the position counter, using a position offset value associated with the determined maximum, wherein the processor is operable to check whether the maximum of the correlation function exceeds a second highest value of the correlation function by a predetermined factor, and the correction of the counter status of the position counter is implemented only when the determined maximum of the correlation function exceeds the second highest value of the correlation function by at least the predetermined factor.

* * * * *